(12) United States Patent
Niederwimmer

(10) Patent No.: US 7,243,575 B2
(45) Date of Patent: Jul. 17, 2007

(54) BRAKING MECHANISM FOR A GEAR

(75) Inventor: Gerhard Niederwimmer, Wallern (AT)

(73) Assignee: BRP-Rotax GmbH & Co. KG, Gunskirchen (AT)

( * ) Notice: Subject to any disclaimer, the term of this patent is extended or adjusted under 35 U.S.C. 154(b) by 0 days.

(21) Appl. No.: 10/395,844

(22) Filed: Mar. 25, 2003

(65) Prior Publication Data

US 2004/0002399 A1    Jan. 1, 2004

Related U.S. Application Data

(60) Provisional application No. 60/366,578, filed on Mar. 25, 2002, provisional application No. 60/440,608, filed on Jan. 17, 2003.

(51) Int. Cl.
*F16H 3/02* (2006.01)

(52) U.S. Cl. .................. 74/745; 74/337.5; 74/339; 74/527; 74/531; 74/540; 74/567; 74/568 FS; 192/51; 192/48.3; 192/48.91; 192/48.92; 474/70; 474/74

(58) Field of Classification Search .................. 74/745, 74/337.5, 339, 527, 531, 540, 541, 575, 576, 74/567, 813 L, 813 R, 568 FS; 192/51, 192/48.3, 48.91, 48.92; 474/69, 70, 74
See application file for complete search history.

(56) References Cited

U.S. PATENT DOCUMENTS

| | | | |
|---|---|---|---|
| 3,850,050 A | * | 11/1974 | Lemmens .................. 475/208 |
| 4,304,150 A | * | 12/1981 | Lupo et al. .................. 475/51 |
| 4,529,393 A | * | 7/1985 | Makishima .................. 474/13 |
| 4,754,859 A | * | 7/1988 | Ouchi et al. .................. 192/45 |
| 4,844,221 A | * | 7/1989 | Sakai et al. ................ 192/3.56 |
| 5,052,990 A | * | 10/1991 | Sakakibara et al. ......... 475/210 |
| 5,193,634 A | * | 3/1993 | Masut ........................ 180/65.2 |
| 5,517,957 A | * | 5/1996 | Wagner et al. ........... 123/192.1 |
| 5,879,254 A | * | 3/1999 | Tanaka ........................ 474/74 |
| 6,568,292 B1 | * | 5/2003 | Zatterqvist .................... 74/319 |
| 6,811,504 B2 | * | 11/2004 | Korenjak et al. ............. 474/14 |

FOREIGN PATENT DOCUMENTS

| | | |
|---|---|---|
| DE | 44 22 427 A1 | 1/1996 |
| DE | 100 09 584 A1 | 9/2001 |
| JP | 60249758 A * | 12/1985 |
| JP | 63120956 A * | 5/1988 |

* cited by examiner

*Primary Examiner*—David D. Le
(74) *Attorney, Agent, or Firm*—Osler, Hoskin & Harcourt LLP

(57) ABSTRACT

An indexing and braking mechanism for a manual transmission having a shifting mechanism and at least one rotatable drive shaft is disclosed. The mechanism includes an indexing mechanism for controlling movement of the shifting mechanism between at least a first position and a neutral position. The indexing mechanism has a plate having a plurality of notches formed thereon, wherein one notch corresponds to the first position and another notch corresponds to the neutral position. A locking mechanism is provided for selectively limiting movement of one of the at least one rotatable drive shaft. The locking mechanism is adapted to selectively engage the plurality of notches to selectively maintain the indexing mechanism in one of the first position and the neutral position. The locking mechanism includes an indexing lever having a contact surface for contacting the rotatable drive shaft.

27 Claims, 3 Drawing Sheets

BRAKING MECHANISM FOR A GEAR

CROSS REFERENCE TO RELATED APPLICATIONS

This application claims priority to U.S. Provisional Patent Application No. 60/366,578, which was filed on Mar. 25, 2002 and U.S. Provisional Patent Application No. 60/440,608, which was filed on Jan. 17, 2003.

BACKGROUND OF THE INVENTION

1. Field of the Invention

The present invention relates to a indexing and locking mechanism for use in a drive train for a motor vehicle to provide for the smooth shifting between gear positions and provide for the braking of intermediate drive shaft in a neutral position. The present invention also relates to a drive train having a free wheel clutch operating in parallel with a centrifugal clutch. The indexing and locking mechanism and the drive train are useable on an all terrain vehicle ("ATV"), scooters or any other recreational vehicle.

2. Description of Related Art

Various manual transmissions for internal combustion engine driven vehicles (e.g., an ATV or a scooter) are known in the art. In a typical arrangement, an internal combustion engine provides energy to drive a drive shaft through suitable engine gearing. This can be accomplished by a belt-driven constant velocity transmission (CVT) that acts, preferably through a manual transmission, on a driven shaft that is connected to at least one driving wheel. A forward gear, a reverse gear, or neutral positions can be selected as desired by the manual transmission.

In the prior art, the drive unit transmits power to the drive shaft through a centrifugal clutch and an interposed CVT. The centrifugal clutch transfers engine torque to the drive shaft a certain engine speeds (e.g., 4000 rpm) and forms a rigid drive connection between the drive unit and the driven shaft above a certain engine speed. At lower engine speeds, no engine torque is transmitted between the drive unit and the driven shaft. This has potential adverse impacts when the engine is used, for example, in an ATV and operated at low engine speeds. When in an idling state, no engine torque and hence no braking moment is transmitted to the driven shaft. When the ATV is positioned on a hill, the ATV picks up speed. The engine cannot control the speed. At low speeds, the engine torque can serve as a braking moment for the driven shaft.

The freewheel clutch can be locked up so as to transmit torque in one direction and to freewheel in the other direction. The purpose of the freewheel clutch is to permit an engine braking effect to act on the driving wheel at low engine speeds, when the centrifugal clutch is not activated. In this way, at low engine speeds, torque can be transferred to the driven shaft. At high engine speeds no engine torque is transferred to the drive shaft through the freewheel clutch. Freewheel clutches, and in particular sleeve-type freewheel clutches, often produce a negative secondary effect, namely, that as a result of friction, a small amount of torque will be transferred in the free-wheel direction. In particular, in the case of rotational conformity of the drive unit, as in the case of four-cycle engines, a small amount of torque will be transferred from the drive unit through the freewheel clutch to the drive shaft. If a gear position is selected from the neutral position by the manual transmission, a jolt or a loud noise is produced. As such, it is desirable to provide a brake to eliminate any rotation associated with the small amounts of torque. Others have tried to provide such a brake.

DE 44 22 427 A1 describes a reverse gear selector for a motor vehicle change-speed gearbox that incorporates a braking device that is actuated during the gear-change process by part of the selector mechanism, and which is used to brake a gear shaft that is still spinning as the result of residual momentum. In this, a part of the gear-change device actuates a switch that allows an auxiliary force to act for a specific period of time on a servo that activates a braking device that in turn acts on the gear shaft that is still spinning. The servo device is in the form of a solenoid that acts through a selector fork, a selector rod, or directly on the synchromesh ring of a forward gear.

DE 100 09 584 A1 shows a multi-speed manual transmission for motor vehicle; this comprises a separating clutch, a drive shaft, and a driven shaft, on which there are gear wheels that mesh with each other in order to provide various gear ratios. The gear wheels for the various gear ratios can be locked positively to the gear shaft through a clutch. Thus, the gear ratios are synchronized centrally, because the gear shaft is slowed down by a flywheel brake when a higher gear is selected, whereas the gear shaft is accelerated by an central engine control unit when changing down to a lower gear. Central synchronization makes it possible to dispense with a synchronizing unit for each gear ratio that is selected.

DE 198 42 478 A1 describes an hydraulic clutch brake for gearboxes. Retardation of the gear shafts, which is usually taken care of by the clutch stop, is effected in that the load on the gear shafts is increased. This can be done, for example, by increasing the hydraulic load of a pump that is driven by a gear shaft.

These braking devices for manual transmissions, however, have rather complex constructions and have relatively high design and production costs.

OBJECTS OF THE INVENTION

It is an object of the present invention to provide a manual transmission for a vehicle that does not produce vehicle jerking when the transmission is moved from a neutral position to either a forward gear position or a reverse gear position.

It another object of the present invention to provide a manual transmission for a vehicle that transfers engine torque at both low and high engine speeds.

It is an object of the present invention to provide a drive unit that includes both a free wheel clutch and a centrifugal clutch.

It is another object of the present invention to provide a manual transmission for a vehicle that does not produce vehicle undesirable noises when the transmission is moved from a neutral position to either a forward gear position or a reverse gear position.

It is another object of the present invention to provide a manual transmission for a vehicle that provides smooth and silent shifting between neutral, forward gear and reverse gear positions.

It is another object of the present invention to brake an idler gear when the manual transmission is in the neutral position.

It is another object of the present invention to provide a braking mechanism for an idler gear when the manual transmission is in the neutral position.

It is another object of the present invention to provide a braking mechanism for use in a manual transmission having both a free wheel clutch and a centrifugal clutch, whereby the braking mechanism is operated during predetermined operating conditions when the free wheel clutch is in operation.

It is still another object of the present invention to provide precise positioning of a selector fork of a manual transmission in the neutral, forward gear and reverse positions.

SUMMARY OF THE INVENTION

In response to the foregoing challenges, applicants have developed a novel drive train for a vehicle. The vehicle includes a drive unit and a driven shaft. The drive train transfers energy generated by the drive unit to the driven shaft. In accordance with the present invention, the drive train includes a continuously variable transmission operatively connected to the drive unit. The drive train further includes a manual transmission having a rotating drive shaft. A free wheel clutch operatively couples the continuously variable transmission to the drive shaft. The manual transmission includes an intermediate drive shaft, which is operatively connected to the drive shaft and the driven shaft. The intermediate drive shaft has a idler gear located thereon that is operatively coupled to the rotating drive shaft.

The intermediate drive shaft is operatively engaged with the driven shaft when the manual transmission is in at least one of a forward position and a reverse position, and the intermediate drive shaft is operatively disengaged from the driven shaft when the manual transmission is in a neutral position. The manual transmission further includes a shifting mechanism to shift the manual transmission between the forward position, the reverse position and the neutral position.

In accordance with the present invention, a shift gate for controlling movement of the shifting mechanism between the forward position, the reverse position and the neutral position is provided. The shift gate has a plurality of notches formed thereon, wherein a first notch corresponds to the forward position, a second notch corresponds to the reverse position and a third notch corresponds to the neutral position.

In accordance with the present invention, an indexing lever is provided to be selectively received in one of the plurality of notches to selectively maintain the shift gate in one of the forward position, the reverse position and the neutral position. The indexing lever is preferably resiliently biased into engagement with one of the plurality of notches. The indexing lever includes a projection extending from one side thereof, wherein the projection is sized to be received within one of the plurality of notches.

In accordance with the present invention, the indexing lever also provides a braking function for the intermediate drive shaft and specifically the idler gear. A lever arm extends from the indexing lever. A contact surface on the lever arm contacts the idler gear. This prevents rotational movement of the intermediate drive shaft when the manual transmission is in a neutral position.

The present invention is also directed to a drive train for a vehicle. The drive train transfers energy generated by the drive unit to the driven shaft. In accordance with the present invention, the drive train includes a continuously variable transmission operatively connected to the drive unit. The drive train further includes a manual transmission having a rotating drive shaft. A free wheel clutch operatively couples the continuously variable transmission to the drive shaft. The manual transmission includes an intermediate drive shaft, which is operatively connected to the drive shaft and the driven shaft. The intermediate drive shaft has a idler gear located thereon that is operatively coupled to the rotating drive shaft.

The intermediate drive shaft is operatively engaged with the driven shaft when the manual transmission is in at least one of a forward position and a reverse position, and the intermediate drive shaft is operatively disengaged from the driven shaft when the manual transmission is in a neutral position. The manual transmission further includes a shifting mechanism to shift the manual transmission between the forward position, the reverse position and the neutral position. In accordance with the present invention, an indexing lever is provided to selectively engage the idler gear in the neutral position to prevent movement of the intermediate drive shaft.

In accordance with the present invention, the drive train includes a shift gate for controlling movement of the shifting mechanism between the forward position, the reverse position and the neutral position. The shift gate has a plurality of notches formed thereon, wherein a first notch corresponds to the forward position, a second notch corresponds to the reverse position and a third notch corresponds to the neutral position. The indexing lever is resiliently biased into engagement with one of the plurality of notches. The indexing lever includes a projection extending from one side thereof. The projection is sized to be received within one of the plurality of notches. The contact surface engages the idler gear when the projection is in the notch corresponding to the neutral position.

The present invention is also directed to an indexing and braking mechanism for a manual transmission having a shifting mechanism and at least one rotatable drive shaft. The mechanism includes an indexing mechanism for controlling movement of the shifting mechanism between a first position, a second position and a neutral position. The indexing mechanism has a plate having a plurality of notches formed thereon, wherein a first notch corresponds to the first position, a second notch corresponds to the second position and a third notch corresponds to the neutral position. A locking mechanism is provided for selectively limiting movement of one of the at least one rotatable drive shaft. The locking mechanism is adapted to selectively engage the plurality of notches to selectively maintain the indexing mechanism in one of the first position, the second position and the neutral position. The locking mechanism includes an indexing lever having a projection extending from one side thereof. The projection is sized to be received within one of the plurality of notches. The locking mechanism includes an indexing lever having a contact surface for contacting the rotatable drive shaft.

In accordance with the present invention, a drive train is disclosed for a vehicle having a drive unit. The drive train transfers energy generated by the drive unit to a driven shaft. The drive train includes a CVT operatively connected to the drive unit. A manual transmission having a rotating drive shaft is connected to the CVT. A free wheel clutch operatively couples the CVT to the drive shaft during predetermined engine operating conditions (i.e., high engine speeds). A centrifugal clutch operatively couples the continuously variable transmission to the drive shaft during predetermined engine operating conditions (i.e., low engine speeds). In accordance with the present invention, th centrifugal clutch and the free wheel clutch are connected in parallel to the continuously variable transmission and the drive shaft.

BRIEF DESCRIPTION OF THE DRAWINGS

The invention will be described in conjunction with the following drawings in which like reference numerals designate like elements and wherein.

DETAILED DESCRIPTION OF PREFERRED EMBODIMENTS

Figure 1:
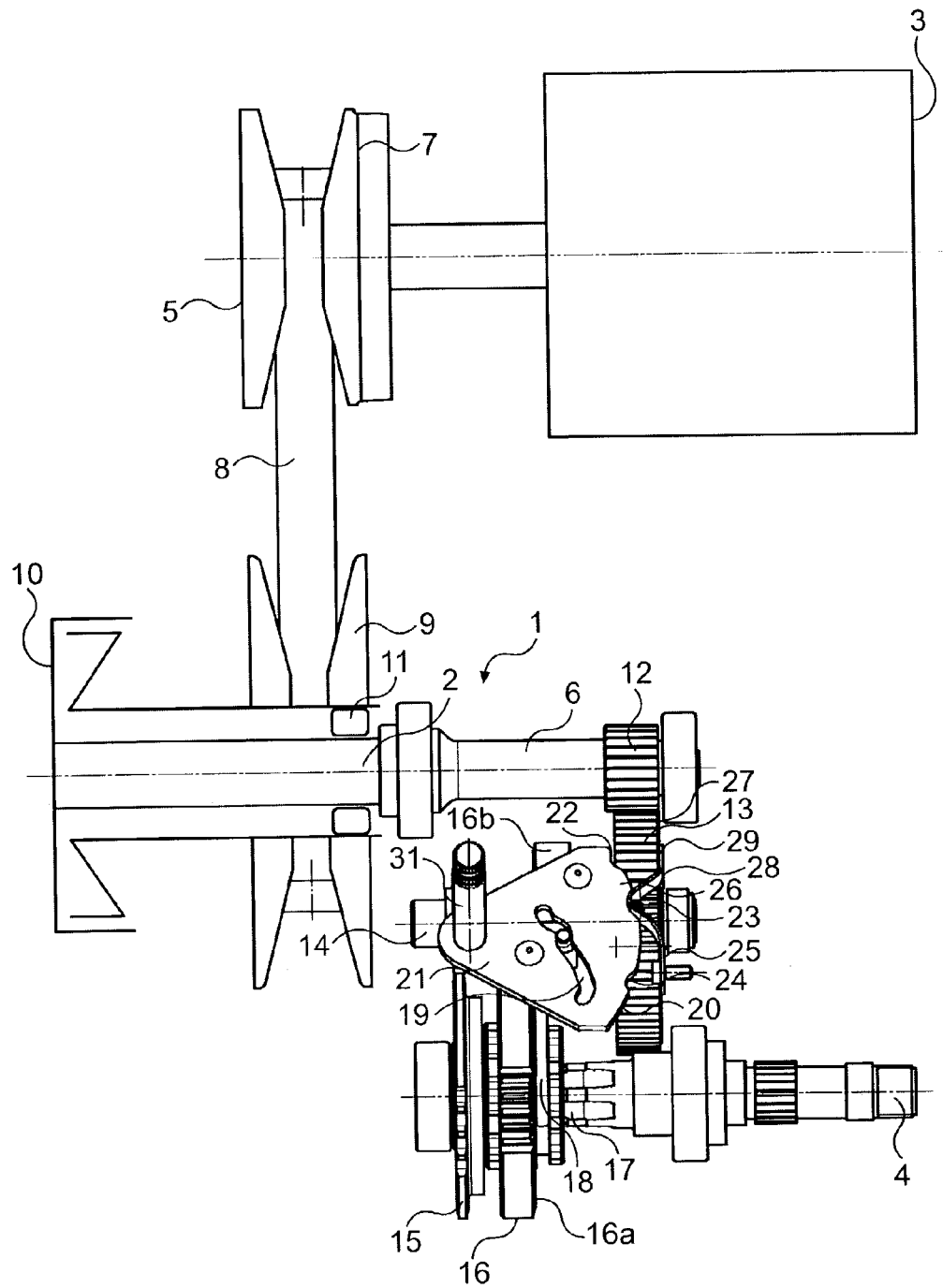
FIG. 1 is a schematic view of a drive train for a vehicle in accordance with the present invention.

A manual transmission or gear arrangement 1 for a vehicle is illustrated in FIG. 1. The manual transmission 1 is arranged in the drive train 2 of the vehicle between a drive unit 3 and a driven shaft 4. The drive unit 3 is preferably an internal combustion engine. The internal combustion engine may be either a two cycle or a four cycle engine. The present invention, however, is not limited solely to the use of an internal combustion engine; rather, other engines are considered to be within the scope of the present invention. The driven shaft 4 is operatively connected to a drive wheel (not shown) of the vehicle. It is contemplated that the driven shaft 4 may be operatively connected to a drive output for various recreational vehicles including but not limited to scooters, ATVs and snowmobiles.

The drive unit 3 is operatively connected to a continuously variable transmission (CVT) 5. The CVT 5 includes a drive pulley 7 connected to the drive unit 3. The CVT 5 also includes a driven pulley 9 spaced from the drive pulley 7. The pulleys 7 and 9 are operatively coupled by a belt 8 such that the torque generated by the pulley 7 is transferred to the driven pulley 9. As shown in FIG. 1, the drive pulley 7 has a smaller diameter than the driven pulley 9. The pulleys 7 and 9 and the belt 8 are configured and operated such that the tension in the belt 8 remains constant. The operation of the CVT 5 is disclosed, for example, in co-pending U.S. patent application Ser. No. 09/944,159 entitled "Continuously Variable Transmission For An Internal Combustion Engine." The disclosure of which is specifically incorporated herein by reference.

The driven pulley 9 is operatively coupled to a drive shaft 6 such that the torque from the driven pulley 9 is transferred to the drive shaft 6. The driven pulley 9 is coupled to the drive shaft 6 by at least one clutch mechanism. Preferably, the at least one clutch mechanism includes a centrifugal clutch 10 and a free wheel clutch 11, as shown in FIG. 1. The clutches 10 and 11 are connected in parallel. With this arrangement, power or torque is transmitted from the CVT 5 to the driven shaft 4 as soon as one of the clutches 10 or 11 is engaged. The centrifugal clutch 10 is designed to transmit power or torque from the CVT 5 to the driven shaft 4 at engine speeds in excess of approximately 4000 rpm. The free wheel clutch 11 transfers engine torque at lower engine speeds. The free wheel clutch 11 may be a sleeve-type free wheel clutch. With the freewheel clutch 11, it is possible for an engine braking moment to act on the driven shaft 4, even if the centrifugal clutch 10 is inactive. With such an arrangement, it is possible to control the operation of the driven shaft at all engine speeds. At lower engine speeds, the transfer of engine torque can function as a braking moment to control the speed of a vehicle as it descends a hill at low engine speeds.

The drive shaft 6 is operatively coupled to an intermediate shaft 14. One end of the drive shaft 6 includes a pinion gear 12. The pinion gear 12 may be integrally formed with the drive shaft 6 or secured thereto as a separate component. The pinion gear 12 is operatively connected to an idler gear 13. The idler gear 13 is connected to an intermediate drive shaft 13 such that the rotational motion of the drive shaft 6 is transferred to the intermediate drive shaft 14 through the pinion gear 12 and the idler gear 13.

Figure 2:
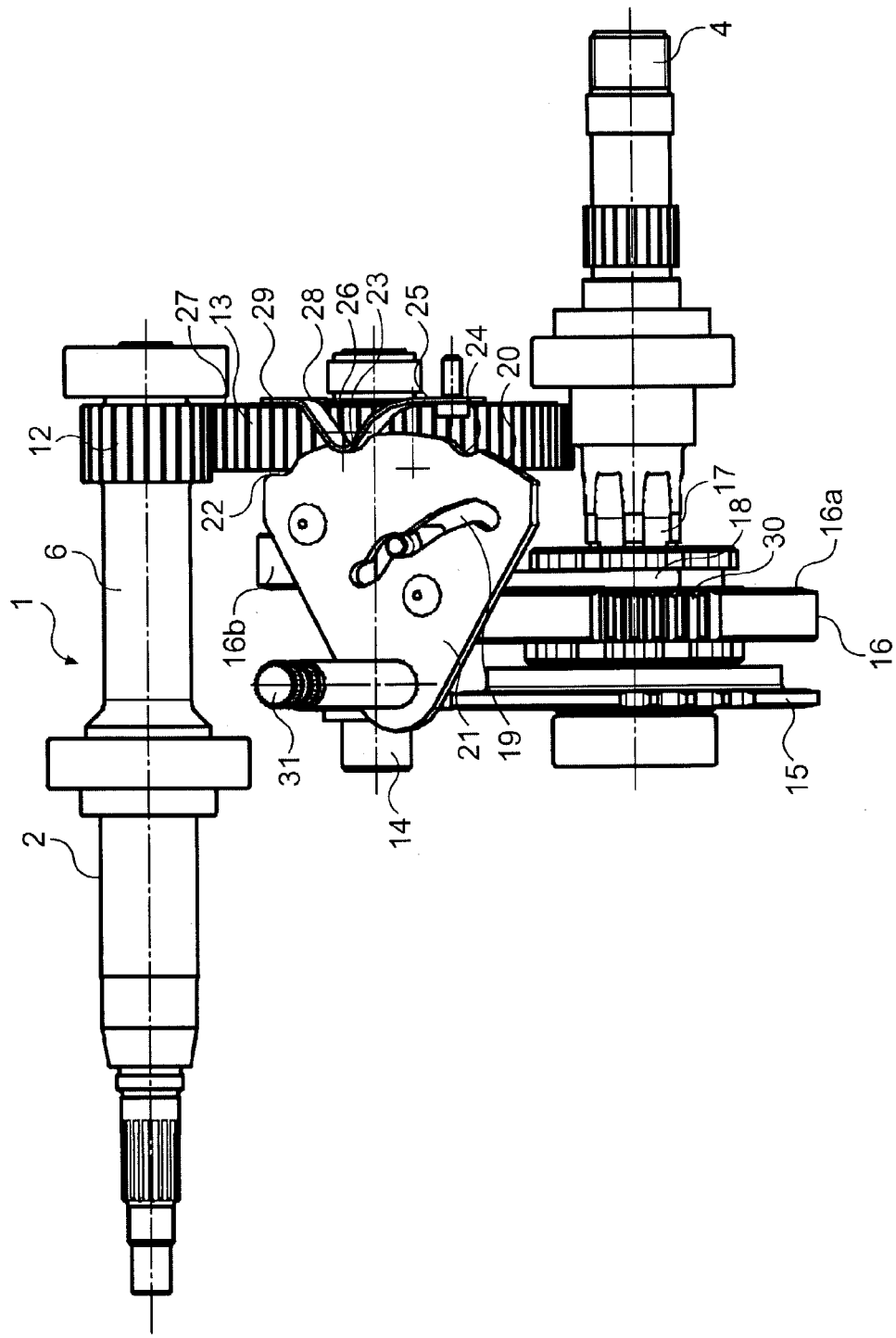
FIG. 2 is a top schematic view of a manual transmission of the drive train of FIG. 1 in a neutral position.

The intermediate drive shaft 14 is operatively coupled to the driven shaft 4 such that the rotational motion of the intermediate drive shaft 14 is transferred to the driven shaft 4. The driven shaft 4 rotates in either the same direction as the rotation of the intermediate drive shaft 14 or in an opposite direction. This coupling is accomplished using a chain drive 15 and a spur gearing mechanism 16. When the chain drive 15 is engaged the driven shaft 4 rotates in the same direction as the intermediate drive shaft 14. In this configuration, the driven shaft 4 is indirectly driven by the intermediate shaft 14. The chain drive 15 and the spur gearing mechanism 16 are disengaged in the position shown in FIGS. 1–3. When the spur gearing mechanism 16 is engaged the driven shaft 4 rotates in a direction opposite to the rotation of the intermediate drive shaft 14. In this configuration, the driven shaft 4 is directly driven by the intermediate drive shaft 14.

The spur gearing mechanism 16 includes a pair of gears. One gear 16b is connected to the intermediate drive shaft 14. Another gear, a selector pinion 16a is slidably connected to the driven shaft 4. The selector pinion 16a is movable with respect to driven shaft 14 to one of several positions. In the neutral position shown in the figures, the selector pinion 16a is disengaged from the gear 16b. The driven shaft 4 is also not engaged with the chain drive 15. When the selector pinion 16a is moved in a position away from the chain drive 15, the gear 16a engages the gear 16b on the intermediate drive shaft 14. In this position, the chain drive 15 is disengaged. When the selector pinion 16a is moved in a direction toward the chain drive 15. The chain drive 15 is engaged and the gear 16b is disengaged.

Figure 3:
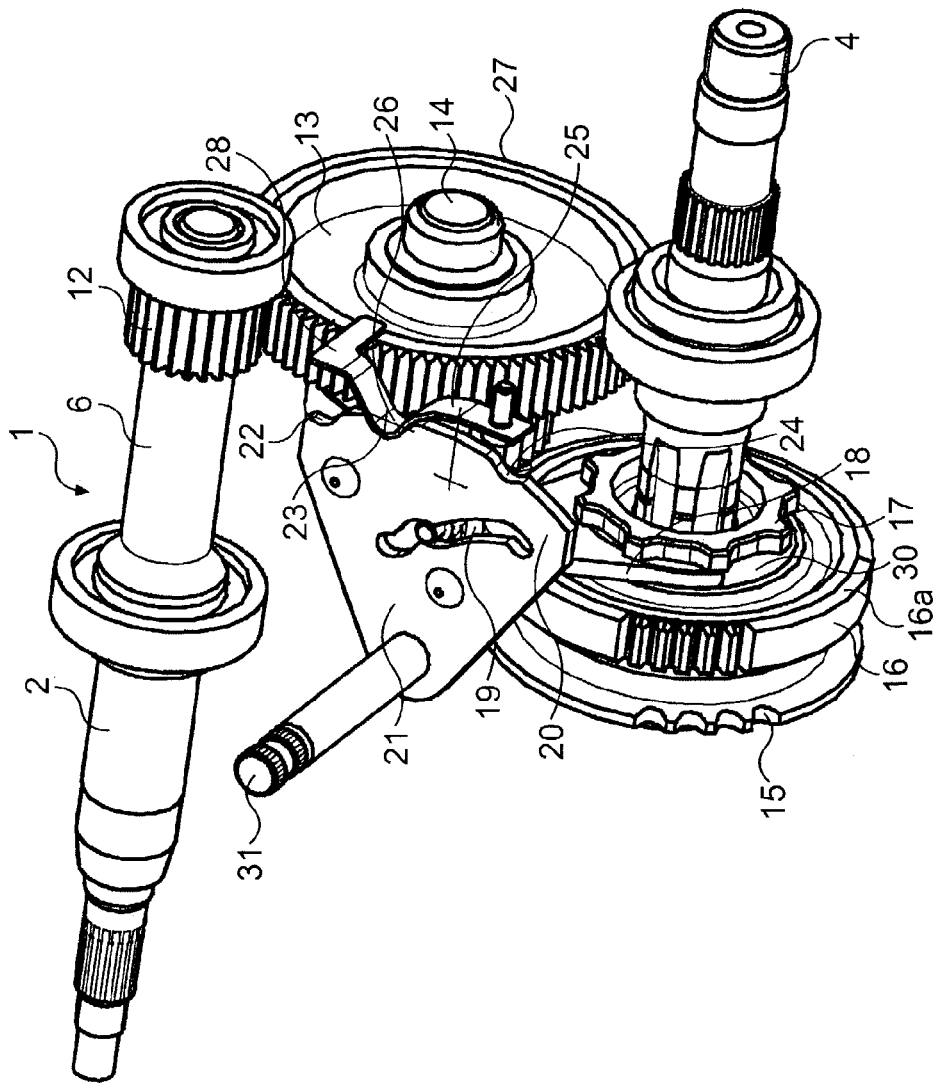
FIG. 3 is a side schematic view of the manual transmission of FIG. 2.

The drive train 2 preferably has at least one drive position including a forward drive position and a reverse drive position. In order to shift between a forward gear position, neutral position, and a reverse gear position, the selector pinion 16a is moved between the above described positions by a selector fork 18 that acts on a sliding bushing 30 associated with the selector pinion 16a, as shown in FIG. 3. The position of the selector fork 18 is controlled by a gearshift gate mechanism 19. The gearshift gate mechanism 19 includes an indexing plate 21 that is pivotable about an axis extending through shaft 31. The indexing plate 21 has an edge 20 having a plurality of notches 22, 23 and 24 formed therein. Each of the notches 22, 23 and 24 corresponds to a specific gear position. Notch 22 corresponds to the forward gear position. Notch 23 corresponds to the neutral position. Notch 24 corresponds to the reverse gear position.

An indexing lever 25 is supported or clamped so as to be fixed to the housing (not shown) of the manual transmission 1. The indexing lever 25 includes a projection or bend 26 that is adapted to be received within the indexing notches 22, 23 and 24 to hold the indexing lever 25 in one of the positions corresponding to the forward, neutral and reverse positions. When the indexing plate 21 is rotated in response to a gear-selection movement, the indexing lever 25 and in particular the projection 26 is moved out of one indexing notches and into another indexing notch. With this arrangement, the gearshift positions are indexed or locked. This achieves precise positioning of the selector fork 18.

The freewheel clutch 11, described above, transmits a small torque moment from the driven pulley 9 of the CVT 5 to the drive shaft 6 when the selector pinion 16a is in a neutral position. This can cause the intermediate shaft 14, together with the chain drive 15 and the gear wheel 16b to rotate. When this occurs and the selector pinion 16a of the manual transmission 1 is shifted from the neutral position to either the forward gear position or the reverse gear position, the vehicle may jerk in an undesirable manner. Furthermore, a relatively loud and unpleasant noise can be generated from the gearbox. These phenomena are prevalent in the prior art.

In accordance with the present invention, the idler gear 13 is braked when in the neutral position. Thus, selection of the forward gear position or the reverse gear position takes place when the intermediate shaft 14 is stationary. This eliminates the jerking and undesirable noises. The braking of the idler gear 13 is accomplished using the indexing lever 25. As such, a perfectly smooth and/or silent shifting process is made possible.

The idler gear 13 has a braking surface 27 formed on a side thereof, as shown in FIG. 3. The indexing lever 25 includes a lever arm 28 located at a free end thereof. The lever arm 28 has a contact surface 29 that is adapted to overlie and engage the braking surface 27 when the manual transmission 1 is in a neutral position, as shown in FIG. 3. The contact between the contact surface 29 and the braking surface 27 is sufficient to prevent movement of the idler gear 13 when the manual transmission is in the neutral position, as shown in FIG. 1. It is contemplated that the either the braking surface 27 or the contact surface 29 of the lever arm 28 may be fitted with a friction pad to increase friction between the two and prevent rotation of the idler gear 13. This reduces excessive wear on the indexing lever arm 28. The braking surface 27 is also spaced from the center point or axis of the idler gear 13. With this arrangement, a good braking effect of the idler gear 13 can be achieved even when relatively small braking forces are applied. The indexing lever 25 provides both braking of the idler gear 13 and indexing of the gear positions. With such an arrangement, braking can be achieved without using the complex prior art devices.

In the neutral position, the projection 26 is located within the notch 23. In order to ensure that the idler gear 13 is braked or restrained by the indexing lever 25 only in the neutral position, the indexing notch 23 that corresponds to the neutral position is made somewhat deeper than the indexing notches 22 and 24 for forward and reverse gears. When the projection 26 is in either notch 22 or 24, the lever arm 28 is spaced from the braking surface 27. It is desirable to make certain that the lever arm 28 does not contact the teeth of the idler gear 13. This is accomplished by providing a set back from the braking surface 27 and the teeth, as shown in FIG. 3.

In accordance with the present invention, the indexing lever 25 is preferably held against the brake surface 27 by spring resistance. The indexing lever 25 is preferably formed from a spring steel. With this construction, the indexing lever 25 is pressed resiliently against the idler gear 13 when in a neutral position, which is sufficient to prevent rotation of the intermediate shaft 14. The present invention, however, is not limited to the use of the spring steel; rather, it is contemplated that the contact surface 29 of the lever arm 28 may be pressed against the idler gear 13 by a separate spring (not shown).

While the invention has been described in connection with what is presently considered to be the most practical and preferred embodiments, it is to be understood that the invention is not to be limited to the disclosed embodiments and elements, but, to the contrary, is intended to cover various modifications, combinations of features, equivalent arrangements, and equivalent elements included within the spirit and scope of the appended claims. Although the present invention has been described in connection with a drive train having both forward and reverse gear positions, the present invention is not intended to be so limited. It is contemplated that the drive train and braking mechanism described above may be used for a drive train having only forward gear positions and a neutral position. With such an arrangement, one of the chain drive or the spur gearing mechanism is omitted along with the notch 24 on the indexing plate 21. Furthermore, the dimensions of features of various components that may appear on the drawings are not meant to be limiting, and the size of the components therein can vary from the size that may be portrayed in the figures herein. Thus, it is intended that the present invention covers the modifications and variations of the invention, provided they come within the scope of the appended claims and their equivalents.

What is claimed is:

1. A drive train for a vehicle, wherein the vehicle includes a drive unit and a driven shaft, wherein the drive train transfers energy generated by the drive unit to the driven shaft, the drive train comprising:
   a continuously variable transmission operatively connected to the drive unit;
   a manual transmission having a rotating drive shaft;
   a free wheel clutch operatively coupling the continuously variable transmission to the drive shaft such that torque from the drive unit is transferred to the continuously variable transmission then to the drive shaft via the free wheel clutch when the free wheel clutch is engaged;
   wherein the manual transmission further includes an intermediate drive shaft, wherein the intermediate drive shaft is operatively connected to the drive shaft and the driven shaft, wherein the intermediate drive shaft has an idler gear located thereon, wherein the idler gear is operatively coupled to the rotating drive shaft;
   wherein the intermediate drive shaft is operatively engaged with the driven shaft when the manual transmission is in at least one drive position, and the intermediate drive shaft is operatively disengaged from the driven shaft when the manual transmission is in a neutral position, wherein the manual transmission further includes a shifting mechanism to shift the manual transmission between the at least one drive position and the neutral position; and
   a shift gate for controlling movement of the shifting mechanism between the drive position and the neutral position, wherein the shift gate has a plurality of notches formed thereon, wherein at least one notch corresponds to the drive position and another notch corresponds to the neutral position; and
   an indexing lever adapted to be selectively received in one of the plurality of notches to selectively maintain the shift gate in one of the at least one drive position and the neutral position.

2. The drive train according to claim 1, wherein the indexing lever includes means for selectively braking the idler gear.

3. The drive train according to claim 2, wherein the braking means comprises a lever arm extending from the indexing lever, wherein the lever arm includes a contact surface for contacting the idler gear.

4. The drive train according to claim 2, wherein the braking means prevents rotational movement of the intermediate drive shaft when the manual transmission is in a neutral position.

5. The drive train according to claim 1, wherein the at least one drive position includes a forward drive position and a reverse drive position, whereby the intermediate drive shaft is operatively engaged with the driven shaft when the manual transmission is in at least one of the forward position and the reverse position, wherein the shifting mechanism shifts the manual transmission between the forward drive position, the reverse drive position and the neutral position.

6. The drive train according to claim 1 incorporated into an all-terrain-vehicle.

7. The drive train according to claim 1 incorporated into a motor scooter.

8. The drive train according to claim 1, wherein the indexing lever is resiliently biased into engagement with one of the plurality of notches.

9. The drive train according to claim 8, wherein the indexing lever includes a projection extending from one side thereof, wherein the projection is sized to be received within one of the plurality of notches.

10. The drive train according to claim 1, further comprising:
a centrifugal clutch operatively coupling the continuously variable transmission to the drive shaft.

11. The drive train according to claim 10, wherein the centrifugal clutch and the free wheel clutch are connected in parallel to the continuously variable transmission and the drive shaft.

12. A drive train for a vehicle, wherein the vehicle includes a drive unit and a driven shaft, wherein the drive train transfers energy generated by the drive unit to the driven shaft, the drive train comprising:
a continuously variable transmission operatively connected to the drive unit;
a manual transmission having a rotating drive shaft for transmitting power through the transmission;
a free wheel clutch operatively coupling the drive unit to the drive shaft;
wherein the manual transmission further includes an intermediate rotating component, wherein the intermediate rotating component is operatively connected to the drive shaft and the driven shaft;
wherein the intermediate rotating component is operatively engaged with the driven shaft when the manual transmission is in at least one drive position, and the intermediate rotating component is operatively disengaged from the driven shaft when the manual transmission is in a neutral position, wherein the manual transmission further includes a shifting mechanism to shift the manual transmission between the at least one position and the neutral position; and
a brake adapted to engage the intermediate rotating component to prevent movement of the intermediate rotating component when the manual transmission is in neutral position to preclude transmission of power through the transmission.

13. The drive train according to claim 12, wherein the free wheel clutch is arranged operatively between the continuously variable transmission and the drive shaft such that the free wheel clutch operatively couples the continuously variable transmission to the drive shaft.

14. The drive train according to claim 12, wherein the brake includes a lever arm, wherein the lever arm includes a contact surface for contacting the intermediate rotating component.

15. The drive train according to claim 12 incorporated into an all-terrain-vehicle.

16. The drive train according to claim 12 incorporated into a motor scooter.

17. The drive train according to claim 12, wherein the intermediate rotating component is an intermediate drive shaft having a idler gear located thereon, wherein the idler gear is operatively coupled to the rotating drive shaft.

18. The drive train according to claim 17, wherein the brake includes a lever arm, wherein the lever arm includes a contact surface for contacting the idler gear.

19. The drive train according to claim 12, wherein the brake comprises an indexing lever.

20. The drive train according to claim 19, further comprising:
a shift gate for controlling movement of the shifting mechanism between the at least one drive position and the neutral position, wherein the shift gate having a plurality of notches formed thereon, wherein at least one notch corresponds to the at least one drive position, and another notch corresponds to the neutral position; and wherein the indexing lever is resiliently biased into engagement with one of the plurality of notches.

21. The drive train according to claim 20, wherein the indexing lever includes a projection extending from one side thereof, wherein the projection is sized to be received within one of the plurality of notches.

22. A drive train for a vehicle, wherein the vehicle includes a drive unit and a driven shaft, wherein the drive train transfers energy generated by the drive unit to the driven shaft, the drive train comprising:
a continuously variable transmission operatively connected to the drive unit;
a manual transmission having a rotating drive shaft;
a free wheel clutch operatively coupling the drive unit to the drive shaft during predetermined engine operating conditions;
a centrifugal clutch operatively coupling the drive unit to the drive shaft during predetermined engine operating conditions;
the free wheel clutch and the centrifugal clutch being arranged in parallel, and
wherein the manual transmission further includes an intermediate drive shaft, wherein the intermediate drive shaft is operatively connected to the drive shaft and the driven shaft;
wherein the intermediate drive shaft is operatively engaged with the driven shaft when the manual transmission is in at least one drive position, and the intermediate drive shaft is operatively disengaged from the driven shaft when the manual transmission is in a neutral position, wherein the manual transmission further includes a shifting mechanism to shift the manual transmission between the at least one drive position and the neutral position.

23. The drive train according to claim 22, wherein the centrifugal clutch and the free wheel clutch are connected in parallel operatively between the continuously variable transmission and the drive shaft.

24. The drive train according to claim 22, further comprising
a shift gate for controlling movement of the shifting mechanism between the at least one drive position and the neutral position, wherein the shift gate having a plurality of notches formed thereon, wherein at least one notch corresponds to the at least one drive position and another notch corresponds to the neutral position; and an indexing lever adapted to be selectively received in one of the plurality of notches to selectively maintain the shift gate in one of the at least one drive position and the neutral position.

25. The drive train according to 22, wherein the predetermined engine operating conditions of the free wheel clutch are predetermined low engine speeds and wherein the predetermined engine operating conditions of the centrifugal clutch are predetermined high engine speeds.

26. The drive train according to claim 22 incorporated into an all-terrain vehicle.

27. The drive train according to claim 22 incorporated into a motor scooter.

* * * * *